United States Patent
Kamigaito

(10) Patent No.: US 11,015,971 B2
(45) Date of Patent: May 25, 2021

(54) COMBINATION WEIGHING DEVICE WITH IMPROVED OPERATION RATE DURING ZERO-CORRECTION

(71) Applicant: Ishida Co., Ltd., Kyoto (JP)

(72) Inventor: Satoru Kamigaito, Ritto (JP)

(73) Assignee: Ishida Co., Ltd., Kyoto (JP)

( * ) Notice: Subject to any disclaimer, the term of this patent is extended or adjusted under 35 U.S.C. 154(b) by 180 days.

(21) Appl. No.: 16/468,688

(22) PCT Filed: Dec. 7, 2017

(86) PCT No.: PCT/JP2017/044041
§ 371 (c)(1),
(2) Date: Jun. 12, 2019

(87) PCT Pub. No.: WO2018/123504
PCT Pub. Date: Jul. 5, 2018

(65) Prior Publication Data
US 2019/0310127 A1   Oct. 10, 2019

(30) Foreign Application Priority Data
Dec. 28, 2016   (JP) .............................. JP2016-256414

(51) Int. Cl.
*G01G 19/393*   (2006.01)
*G01G 23/01*    (2006.01)
*G01G 19/387*   (2006.01)

(52) U.S. Cl.
CPC ......... *G01G 19/393* (2013.01); *G01G 19/387* (2013.01); *G01G 23/01* (2013.01)

(58) Field of Classification Search
CPC ..... G01G 19/387; G01G 19/393; G01G 23/01
See application file for complete search history.

(56) References Cited

U.S. PATENT DOCUMENTS

| 4,560,015 A | * | 12/1985 | Minamida | ............ | G01G 19/393 |
| | | | | | 177/25.18 |
| 4,630,696 A | | 12/1986 | Kemnitz | | |
| 4,846,291 A | * | 7/1989 | Osawa | ................. | G01G 19/393 |
| | | | | | 177/25.18 |

FOREIGN PATENT DOCUMENTS

| CN | 106068445 A | 11/2016 |
| JP | S60-211320 A | 10/1985 |

(Continued)

OTHER PUBLICATIONS

The extended European search report issued by the European Patent Office dated Jul. 22, 2020, which corresponds to European Patent Application No. 17885889.0-1001 and is related to U.S. Appl. No. 16/468,688.

(Continued)

*Primary Examiner* — Randy W Gibson
(74) *Attorney, Agent, or Firm* — Studebaker & Brackett PC

(57) ABSTRACT

A combination weighing device 1 includes: a plurality of weighing hoppers 6 which receive articles supplied from an outside, weigh the articles, and discharge the articles; a plurality of booster hoppers 7 which are respectively disposed right below the plurality of weighing hoppers 6 and receive the articles discharged from the weighing hoppers 6; and a control unit 20 which calculates a combination of weighed values so that a total value becomes a target value from a plurality of weighed values respectively correlated with the weighing hoppers 6 and the booster hoppers 7, in which the control unit 20 extracts the weighing hopper 6, corresponding to the booster hopper 7 having the article existing therein and capable of using the weighed value of the article in next combination calculation, as a zero-correction target.

8 Claims, 2 Drawing Sheets

(56) References Cited

FOREIGN PATENT DOCUMENTS

| JP | H02-278128 | A | 11/1990 |
|----|------------|---|---------|
| JP | 2002-214026 | A | 7/2002 |
| JP | 2006-090711 | A | 4/2006 |
| JP | 2007-248239 | A | 9/2007 |
| JP | 4578189 | B2 | 11/2010 |
| JP | 4755511 | B2 | 8/2011 |

OTHER PUBLICATIONS

An Office Action issued by the China National Intellectual Property Administration dated Aug. 21, 2020, which corresponds to Chinese Patent Application No. 201780078669.4 and is related to U.S. Appl. No. 16/468,688 with English language translation.
International Search Report issued in PCT/JP2017/044041; dated Feb. 13, 2018.
International Preliminary Report on Patentability and Written Opinion issued in PCT/JP2017/044041; dated Jul. 2, 2019.

* cited by examiner ically, even when the zero-correction of the extracted weighing hopper is performed, the booster hopper corresponding to the weighing hopper can participate in the combination calculation. For that reason, the number of the hoppers which can participate in the combination calculation does not decrease. Thus, the combination weighing device can improve the operation rate.

COMBINATION WEIGHING DEVICE WITH IMPROVED OPERATION RATE DURING ZERO-CORRECTION

TECHNICAL FIELD

The present invention relates to a combination weighing device.

BACKGROUND ART

In a combination weighing device, a weighing hopper which weighs articles is subjected to zero-correction in order to maintain weighing accuracy. For example, a combination weighing device described in Patent Literature 1 empties a weighing hopper every predetermined number of times and performs zero-correction of the weighing hopper.

CITATION LIST

Patent Literature

Patent Literature 1: Japanese Unexamined Patent Publication No. H2-278128

SUMMARY OF INVENTION

Technical Problem

As described above, in the combination weighing device, there is a need to empty the weighing hopper when performing zero-correction of the weighing hopper. In a case in which an empty booster hopper is disposed right below the weighing hopper, an article is not supplied to a corresponding booster hopper during a zero-correction period of the weighing hopper when the weighing hopper is subjected to zero-correction. For that reason, the booster hopper cannot participate in the next combination calculation. Accordingly, since the number of hoppers which can participate in the combination calculation decreases, the operation rate of the combination weighing device decreases.

An object of an aspect of the present invention is to provide a combination weighing device capable of improving an operation rate.

Solution to Problem

A combination weighing device according to an aspect of the present invention includes: a plurality of weighing hoppers which receive articles supplied from an outside, weigh the articles, and discharge the articles; a plurality of booster hoppers which are respectively disposed right below the plurality of weighing hoppers and receive the articles discharged from the weighing hoppers; and a control unit which calculates a combination of weighed values so that a total value becomes a target value from a plurality of weighed values respectively correlated with the weighing hoppers and the booster hoppers, in which the control unit extracts the weighing hopper, corresponding to the booster hopper having the article existing therein and capable of using the weighed value of the article in next combination calculation, as a zero-correction target.

In the combination weighing device according to an aspect of the present invention, the weighing hopper corresponding to the booster hopper having the article existing therein and capable of using the weighed value of the article as the next combination calculation is extracted. Accordingly, even when the zero-correction of the extracted weighing hopper is performed, the booster hopper corresponding to the weighing hopper can participate in the combination calculation. For that reason, the number of the hoppers which can participate in the combination calculation does not decrease. Thus, the combination weighing device can improve the operation rate.

In one embodiment, the control unit may extract the weighing hopper, corresponding to the booster hopper having the article of the weighed value closes to a predetermined target value, as a zero-correction target. The target value is set to a value which is easily used for the combination calculation. For that reason, since the weighing hopper corresponding to the booster hopper having the article of the weighed value closest to the target value is extracted, the article existing in the booster hopper can be used for the combination calculation.

In one embodiment, the control unit may extract the weighing hopper, corresponding to the booster hopper having the article of the weighed value closest to a statistical value based on the learning of the combination calculation, as a zero-correction target. The statistical value based on the learning is a value which is frequently used for the combination calculation. For that reason, since the weighing hopper corresponding to the booster hopper having the article of the weighed value closest to the statistical value is extracted, the article existing in the booster hopper can be used for the combination calculation.

In one embodiment, the control unit may perform zero-correction of the weighing hopper on the basis of a priority involving with the zero-correction of the weighing hopper and raises the priority of the extracted weighing hopper. In this configuration, the zero-correction of the weighing hopper having the highest priority is performed first. For that reason, since the priority of the extracted weighing hopper is raised, the zero-correction of the extracted weighing hopper is performed when the priority at that time point is highest.

In one embodiment, the control unit may set the priority on the basis of the number of times of the zero-correction of the weighing hopper and raise the priority of the weighing hopper of which the number of times of zero-correction is small. Accordingly, the zero-correction of the weighing hopper not subjected to the zero-correction is performed first. Thus, it is possible to prevent a decrease in weighing accuracy.

In one embodiment, the control unit may add the weighing hopper, not extracted as the zero-correction target to the weighing hopper extracted as the zero-correction target, as a zero-correction target on the basis of an interval from the previous zero-correction of the weighing hopper not extracted as the zero-correction target to a current time point. Accordingly, when an interval from the previous zero-correction to a current time point is large, the weighing hopper which is not extracted as the zero-correction target can be set as a zero-correction target. For that reason, since it is possible to avoid a situation in which the zero-correction of the weighing hopper is not performed a long time, it is possible to prevent a decrease in weighing accuracy.

In one embodiment, the control unit may perform zero-correction of the weighing hopper satisfying a predetermined reference when an interval from the previous zero-correction to a current time point satisfies the reference. Accordingly, since it is possible to avoid a situation in which the zero-correction of the weighing hopper is not performed for a long time, it is possible to prevent a decrease in weighing accuracy.

Advantageous Effects of Invention

According to an aspect of the present invention, it is possible to improve the operation efficiency of the combination weighing device.

DESCRIPTION OF EMBODIMENTS

Figure 1:
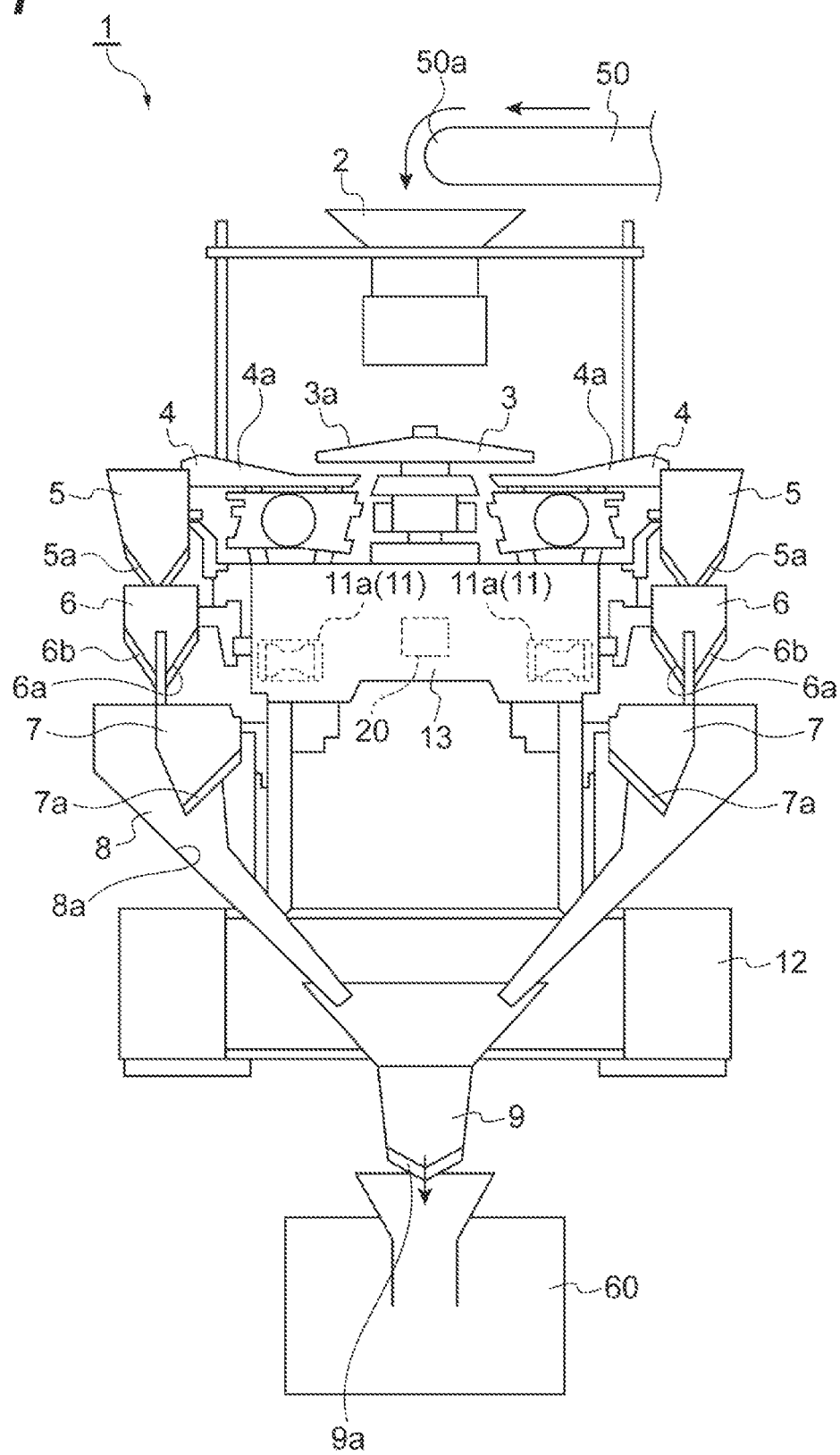
FIG. 1 is a diagram illustrating a configuration of a combination weighing device according to an embodiment.

Hereinafter, a preferred embodiment of the present invention will be described in detail with reference to the accompanying drawings. In the description of the drawings, the same reference numerals will be given to the same or corresponding components and a repetitive description will be omitted.

As illustrated in FIG. 1, a combination weighing device 1 includes a feeding chute 2, a dispersion feeder 3, a plurality of radiation feeders 4, a plurality of pool hoppers 5, a plurality of weighing hoppers 6, a plurality of booster hoppers 7, a collecting chute 8, a timing hopper 9, a weighing unit 11, and a control unit 20. The combination weighing device 1 weighs an article supplied by a conveyor 50 so as to obtain a target weighed value and supplies the article to a bag manufacturing and packaging machine 60. Here, the article is an article having a single weight variation such as agricultural products, marine products, and processed foods. The bag manufacturing and packaging machine 60 packages the article which is weighed and supplied by the combination weighing device 1 while molding a film into a bag of a predetermined volume.

The feeding chute 2 is disposed below a conveying end 50a of the conveyor 50. The feeding chute 2 receives the article dropped from the conveying end 50a of the conveyor 50 and discharges the article downward.

The dispersion feeder 3 is disposed below the feeding chute 2. The dispersion feeder 3 includes a conical conveying surface 3a that diverges downwards. The dispersion feeder 3 vibrates the conveying surface 3a so that the article discharged from the feeding chute 2 to a top portion of the conveying surface 3a is uniformly conveyed toward the outer edge of the conveying surface 3a.

The plurality of radiation feeders 4 are radially disposed along the outer edge of the conveying surface 3a of the dispersion feeder 3. Each radiation feeder 4 includes a trough 4a which extends outward from the lower side of the outer edge of the conveying surface 3a. Each radiation feeder 4 vibrates the trough 4a so that the article discharged from the outer edge of the conveying surface 3a is conveyed toward a front end portion of the trough 4a.

Each pool hopper 5 is disposed below the front end portion of the trough 4a of each radiation feeder 4. A bottom portion of each pool hopper 5 is provided with an openable/closeable gate 5a. Each pool hopper 5 temporarily stores the article discharged from the front end portion of the corresponding trough 4a while closing the gate 5a and discharges the temporarily stored article downward by opening the gate 5a.

Each weighing hopper 6 is disposed below the gate 5a of each pool hopper 5. A bottom portion of each weighing hopper 6 is provided with openable/closeable gates 6a and 6b. Each weighing hopper 6 temporarily stores the article discharged from the corresponding pool hopper 5 while closing the gate 6a and the gate 6b and discharges the temporarily stored article downward by opening the gate 6a or the gate 6b.

Each booster hopper 7 is disposed right below (below) the gate 6a of each weighing hopper 6. A bottom portion of each booster hopper 7 is provided with an openable/closeable gate 7a. Each booster hopper 7 temporarily stores the article discharged from the gate 6a of the corresponding weighing hopper 6 while closing the gate 7a and discharges the temporarily stored article downward by opening the gate 7a.

The collecting chute 8 is formed in a cylindrical shape having a truncated conical inner surface 8a which is tapered downward. The collecting chute 8 is disposed so that the inner surface 8a is located below all weighing hoppers 6 and all booster hoppers 7. The collecting chute 8 receives the article discharged from the gate 6b of each weighing hopper 6 and the article discharged from each booster hopper 7 by the inner surface 8a and discharges the articles downward.

The timing hopper 9 is disposed below the collecting chute 8. A bottom portion of the timing hopper 9 is provided with an openable/closeable gate 9a. The timing hopper 9 temporarily stores the article discharged from the collecting chute 8 while closing the gate 9a and discharges the temporarily stored article to the bag manufacturing and packaging machine 60 by opening the gate 9a.

The weighing unit 11 is disposed inside a casing 13 supported by a frame 12. The weighing unit 11 includes a plurality of load cells 11a. Each load cell 11a supports the corresponding weighing hopper 6. The weighing unit 11 weighs the weighed value corresponding to the weight of the article when temporarily storing the article in each weighing hopper 6.

The control unit 20 is disposed inside the casing 13. The control unit 20 is a device which controls various operations of the combination weighing device 1 and is a signal processing device which includes a central processing unit (CPU), a read only memory (ROM), a random access memory (RAM), and the like. The control unit 20 controls the operations of respective units of the combination weighing device 1 such as the conveying operations of the dispersion feeder 3 and the radiation feeders 4, the opening/closing operations of the gates 5a of the pool hoppers 5, the opening/closing operations of the gates 6a and the gates 6b of the weighing hoppers 6, the opening/closing operations of the gates 7a of the booster hoppers 7, and the gates 9a of the timing hoppers 9.

The control unit 20 memorizes the weighed value weighed by the weighing unit 11 and the weighing hopper 6 and/or the booster hopper 7 storing the article corresponding to the weighed value in a correlated state. Specifically, the control unit 20 memorizes the weighed value weighed by the weighing unit 11 and the weighing hopper 6 storing the article corresponding to the weighed value in a correlated state when the article weighed by the weighing unit 11 is stored in the weighing hopper 6. When the article weighed by the weighing unit 11 is discharged to the booster hopper 7 corresponding to the weighing hopper 6, the control unit 20 memorizes the weighed value of the article weighed by the weighing unit 11 and the booster hopper 7 corresponding to the weighing hopper 6 in a correlated state.

The control unit 20 calculates a combination of the weighed values so that a total value becomes a target value from a plurality of the weighed values which are weighed by the weighing unit 11 and respectively correlated with the plurality of weighing hoppers 6 and/or booster hoppers 7. Specifically, the control unit 20 calculates a combination of the weighed values so that a total value enters a predetermined range having a lower limit value corresponding to the target value from the plurality of weighed values output from the weighing unit 11. Then, the control unit 20 discharges the article to the weighing hopper 6 and/or the booster hopper 7 corresponding to the combination.

The feeding chute 2, the dispersion feeder 3, the plurality of radiation feeders 4, the plurality of pool hoppers 5, and the plurality of weighing hoppers 6 are directly or indirectly supported by the casing 13. The plurality of booster hoppers 7, the collecting chute 8, and the timing hopper 9 are directly or indirectly supported by the frame 12.

Next, an operation of the control unit 20 will be described in detail. The control unit 20 performs zero-correction of the weighing hopper 6. The control unit 20 performs zero-correction of the weighing hopper 6 not storing the article. Specifically, the control unit 20 sets the weighed value weighed by the load cell 11a supporting the weighing hopper 6 not storing the article as a tare weight. The tare weight is a weight including the weighing hopper 6 not storing the article, a support bracket thereof, and the like. The weighing unit 11 calculates the weighed value of the article by subtracting the tare weight from the value weighed by the load cell 11a. In the embodiment, the control unit 20 performs zero-correction of one weighing hopper 6 at one timing. The control unit 20 generally performs zero-correction of each weighing hopper 6 at a predetermined cycle (an automatic zero interval).

The control unit 20 performs the zero-correction of the weighing hopper 6 on the basis of the priority involving with the zero-correction of the weighing hopper 6. The priority is set on the basis of the number of times of the zero-correction of the weighing hopper 6 and a predetermined condition. The control unit 20 performs the zero-correction of the weighing hopper 6 according to a predetermined order at the time of starting the operation. The predetermined order is, for example, an order from the small number of the numbers (for example 1, 2, 3, . . . ) respectively set to the plurality of weighing hoppers 6. The control unit 20 counts an interval in which the zero-correction of the weighing hopper 6 is not performed from the previous zero-correction to a current time point and sets the priority on the basis of the count number (the non-zero counter). The interval is, for example, the number of weighing cycles and/or the time. The control unit 20 sets the priority so that the priority is high when the count number is high. That is, the control unit 20 sets the priority so that the priority of the weighing hopper 6 having the highest count number is the highest. For example, when the count number of one weighing hopper 6 exceeds the number obtained by multiplying the predetermined cycle by the total number of the weighing hopper 6, the control unit 20 immediately performs the zero-correction of the weighing hopper 6 regardless of the interval from the previous zero-correction to the next zero-correction.

The control unit 20 extracts the weighing hopper 6 corresponding to the booster hopper 7 having the article existing therein and capable of using the weighed value of the article in the next combination calculation as a zero-correction target. Specifically, when there are the plurality of booster hoppers 7 having the article existing therein and capable of using the weighed value of the article in the next combination calculation, the control unit 20 extracts the booster hopper 7 having the article of the weighed value closest to a predetermined target value and extracts the weighing hopper 6 corresponding to the booster hopper 7. The control unit 20 extracts the booster hopper 7 having the article existing therein and capable of using the weighed value of the article in the next combination calculation on the basis of the memorized weighed value and the combination calculation. The control unit 20 raises the priority of the zero-correction of the extracted weighing hopper 6.

The control unit 20 performs the zero-correction of the weighing hopper 6 having the highest priority in the priority set as described above. Specifically, when the priority of the weighing hopper 6 extracted as the zero-correction target is the highest at the current time point, the control unit 20 performs the zero-correction of the weighing hopper 6. When there is also another weighing hopper 6 having a high priority set based on the count number as compared with the priority of the weighing hopper 6 extracted as the zero-correction target, the control unit 20 performs the zero-correction of the another weighing hopper 6. Alternatively, when the zero-correction target is not extracted, the control unit 20 performs the zero-correction of the weighing hopper 6 having the highest priority based on the count number.

The control unit 20 lowers the priority of the weighing hopper 6 subjected to the zero-correction. When the zero-correction of the weighing hopper 6 extracted as the zero-correction target is not performed, the control unit 20 lowers the priority of the weighing hopper 6. That is, the control unit 20 lowers the priority raised in the weighing hopper 6 extracted as the zero-correction target and sets only the priority based on the count number.

Next, an operation of the combination weighing device 1 will be described with reference to FIG. 2.

Figure 2:
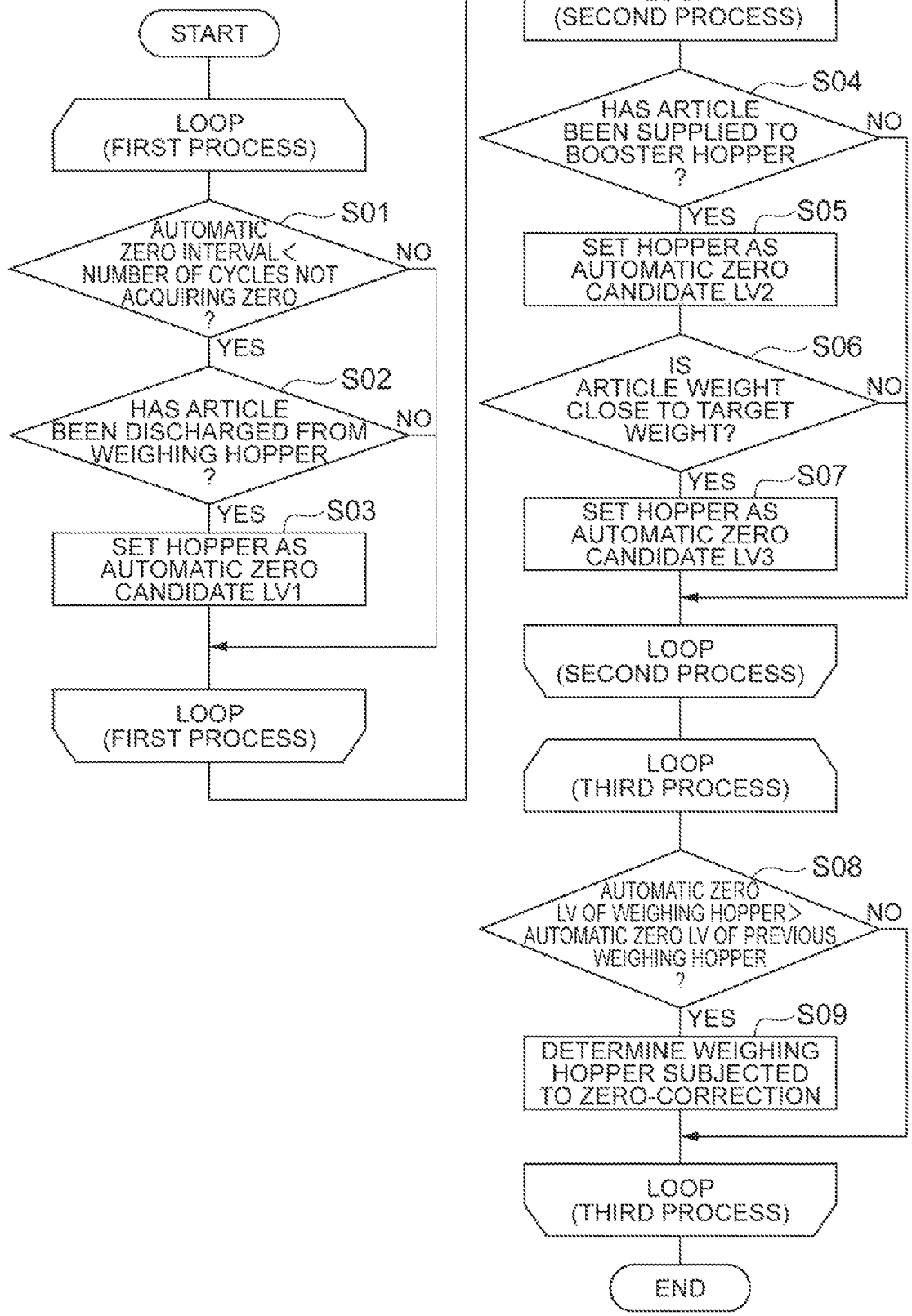
FIG. 2 is a flowchart illustrating an operation of the combination weighing device.

As illustrated in FIG. 2, the following first process (step S01 to step S03) for each of the plurality of (in the embodiment, fourteen) weighing hoppers 6 is performed first. First, it is determined whether the automatic zero interval is smaller than the number of cycles not acquiring zero (not performing zero-correction) (step S01). When it is determined that the automatic zero interval is smaller than the number of cycles not acquiring zero, the routine proceeds to step S02. Meanwhile, when it is not determined that the automatic zero interval is smaller than the number of cycles not acquiring zero, the first process is repeated.

In step S02, it is determined whether the weighing hopper 6 has discharged the article. When it is determined that the weighing hopper 6 has discharged the article, the hopper is set as an automatic zero candidate LV1 (step S03). The case of setting the hopper as the automatic zero candidate LV1 mentioned herein corresponds to the case of increasing the priority as described above. Meanwhile, when it is not determined that the weighing hopper 6 has discharged the article, the first process is repeated.

Next, the following second process (step S04 to step 07) is performed. The second process is performed for the weighing hopper 6 which is set as the automatic zero candidate LV1 in the first process. First, it is determined whether the article discharged from the weighing hopper 6 has entered the booster hopper 7 (step S04). When it is determined that the article discharged from the weighing hopper 6 has entered the booster hopper 7, the hopper is set as an automatic zero candidate LV2 (step S05). Meanwhile, when it is not determined that the article discharged from the weighing hopper 6 has entered the booster hopper 7, the second process is repeated.

When the hopper is set as the automatic zero candidate LV1, it is determined whether the weight of the article discharged to the booster hopper 7 is close to the target weight (step S06). When it is determined that the weight of the article discharged to the booster hopper 7 is close to the target weight, the hopper is set as an automatic zero candidate LV3 (step S07). Meanwhile, when it is not determined that the weight of the article discharged to the booster hopper 7 is close to the target weight, the third process is repeated.

Next, the following third process (step S08 and step S09) is performed. The third process is performed for the weighing hopper 6 in which the automatic zero candidate LV is LV1 or more and is maximal in the second process. First, it is determined whether the automatic zero candidate LV of the weighing hopper 6 (hereinafter, the extracted weighing hopper 6) extracted by the first process and the second process is larger than the automatic zero candidate LV of the weighing hopper 6 (hereinafter, the previous weighing hopper 6) which is extracted as a zero-correction candidate earlier than the weighing hopper 6 (step S08). That is, it is determined whether the counter number of the extracted weighing hopper 6 is larger than the count number of the previous weighing hopper 6. When it is determined that the automatic zero candidate LV of the extracted weighing hopper 6 is larger than the automatic zero candidate LV of the previous weighing hopper 6, the previous weighing hopper 6 is cleared from the zero-correction target and the extracted weighing hopper 6 is determined as a zero-correction target (step S09). Meanwhile, when it is not determined that the automatic zero candidate LV of the extracted weighing hopper 6 is larger than the automatic zero candidate LV of the previous weighing hopper 6, the third process is repeated. As described above, the weighing hopper 6 to be subjected to the zero-correction is determined.

As described above, in the combination weighing device 1 according to the embodiment, the weighing hopper 6 corresponding to the booster hopper 7 having the article existing therein and capable of using the weighed value of the article in the next combination calculation is extracted. Accordingly, even when the zero-correction of the extracted weighing hopper 6 is performed, the booster hopper 7 corresponding to the weighing hopper 6 can participate in the combination calculation. For that reason, the number of the hoppers which can participate in the combination calculation does not decrease. Thus, the combination weighing device 1 can improve the operation rate.

In the combination weighing device 1 according to the embodiment, the control unit 20 extracts the weighing hopper 6 corresponding to the booster hopper 7 having the article of the weighed value closest to a predetermined target value as a zero-correction target. The target value is set to a value which is easily used for the combination calculation. For that reason, since the weighing hopper 6 corresponding to the booster hopper 7 having the article of the weighed value closest to the target value is extracted, the article existing in the booster hopper 7 can be used for the combination calculation.

In the combination weighing device 1 according to the embodiment, the control unit 20 performs the zero-correction of the weighing hopper 6 on the basis of the priority involving with the zero-correction of the weighing hopper 6. The control unit 20 raises the priority of the weighing hopper 6 extracted as the zero-correction target. In this configuration, the zero-correction of the weighing hopper 6 having the highest priority is performed first. For that reason, since the priority of the extracted weighing hopper 6 is high, the zero-correction of the extracted weighing hopper 6 is performed when the priority is the highest at that time point.

In the combination weighing device 1 according to the embodiment, the control unit 20 sets the priority on the basis of the number of times of the zero-correction of the weighing hopper 6 and raises the priority of the weighing hopper 6 of which the number of times of the zero-correction is small. Accordingly, the zero-correction of the weighing hopper 6 not subjected to the zero-correction is performed first. Thus, in the combination weighing device 1, it is possible to prevent a decrease in weighing accuracy.

Although the embodiment of the present invention has been described above, the present invention is not limited to the above-described embodiment and can be modified into various forms without departing from the spirit thereof.

In the above-described embodiment, an example of a configuration in which the control unit 20 extracts the weighing hopper corresponding to the booster hopper having the article of the weighed value closest to a predetermined target value as a zero-correction target has been described. However, the control unit 20 may extract the weighing hopper 6 corresponding to the booster hopper 7 having the article of the weighed value closest to a statistical value based on the learning of the combination calculation as a zero-correction target. The statistical value based on the learning is a value which is frequently used for the combination calculation. For that reason, since the weighing hopper 6 corresponding to the booster hopper 7 having the article of the weighed value closest to the statistical value is extracted, the article existing in the booster hopper 7 can be used for the combination calculation.

In the above-described embodiment, an example of a configuration in which the control unit 20 performs the zero-correction of the weighing hopper 6 on the basis of the priority involving with the zero-correction of the weighing hopper 6 has been described. However, a method of performing the zero-correction of the weighing hopper 6 in the control unit 20 is not limited thereto. For example, the control unit 20 may add the weighing hopper 6, not extracted as the zero-correction target to the weighing hopper 6 extracted as the zero-correction target, as a zero-correction target on the basis of an interval from the previous zero-correction of the weighing hopper 6 not extracted as the zero-correction target to a current time point. When the interval from the previous zero-correction to a current time point satisfies a predetermined reference, the control unit 20 may perform the zero-correction of the weighing hopper 6 satisfying the reference. The interval is, for example, the number of weighing cycles and/or the time.

Specifically, similarly to the above-described embodiment, the control unit 20 extracts the weighing hopper 6 corresponding to the booster hopper 7 having the article existing therein and capable of using the weighed value of the article in the next combination calculation as a zero-correction target (Step 1). The control unit 20 determines whether an interval from the previous zero-correction of the weighing hopper 6 not extracted in Step 1 to a current time point satisfies a first reference. The first reference is set arbitrarily, statistically, or the like. When the control unit 20 determines that the first reference is satisfied, the weighing hopper 6 is added as a zero-correction target (Step 2). The control unit 20 performs the zero-correction of the weighing hopper 6 which is a zero-correction target. The control unit 20 determines whether there is the weighing hopper 6 in which an interval from the previous zero-correction to a current time point satisfies a second reference. The second reference is higher than the first reference (the interval is large). When the control unit 20 determines that the weighing hopper 6 satisfying the second reference exists, the zero-correction of the weighing hopper 6 is performed first (Step 3). Step 3 may be performed before Step 1 or Step 2.

According to the above-described method, when an interval from the previous zero-correction to a current time point is large, the weighing hopper 6 which is not extracted as the zero-correction target can be set as a zero-correction target. For that reason, since it is possible to avoid a situation in which the zero-correction of the weighing hopper 6 is not performed for a long time, it is possible to prevent a decrease in weighing accuracy.

In the above-described embodiment, a configuration of conveying the article by the vibration of the dispersion feeder 3 and the plurality of radiation feeders 4 has been described as an example. However, any configuration can be employed as long as the dispersion feeder 3 and the plurality of radiation feeders 4 can convey the article. In the above-described embodiment, a circular arrangement in which the combination weighing device 1 includes the dispersion feeder 3 and the radiation feeders 4 are radially arranged around the dispersion feeder 3 has been described as an example. However, a linear arrangement in which the combination weighing device includes the conveying unit and the weighing unit arranged in series may be employed.

In the above-described embodiment, a case in which the plurality of weighing hoppers 6 and the plurality of booster hoppers 7 are radially disposed has been described. However, the plurality of weighing hoppers 6 and the plurality of booster hoppers 7 may be arranged in a matrix shape.

In the above-described embodiment, the radiation feeder 4 has been described as an example of the conveying unit, but the conveying unit may be configured to convey the article by, for example, a rotatable coil unit (screw) or a belt conveyor. In the case of the coil unit, the control unit controls the rotation speed (rpm) or the like of the coil unit by supplied power. In the case of the belt conveyor, the control unit controls the rotation speed or the like of the roller driving the belt.

REFERENCE SIGNS LIST

1: combination weighing device, 6: weighing hopper, 7: booster hopper, 20: control unit.

The invention claimed is:

1. A combination weighing device comprising:
    a plurality of weighing hoppers which receive articles supplied from an outside, weigh the articles, and discharge the articles;
    a plurality of booster hoppers which are respectively disposed right below the plurality of weighing hoppers and receive the articles discharged from the weighing hoppers; and
    a control unit which calculates a combination of weighed values so that a total value becomes a target value from a plurality of weighed values respectively correlated with the weighing hoppers and the booster hoppers,
    wherein the control unit selects the weighing hopper, corresponding to the booster hopper having the articles therein and capable of using the weighed value of the articles in a next combination calculation, as a zero-correction target.

2. The combination weighing device according to claim 1, wherein the control unit selects the weighing hopper, corresponding to the booster hopper having the article of the weighed value closest to a predetermined target value, as a zero-correction target.

3. The combination weighing device according to claim 1, wherein the control unit selects the weighing hopper, corresponding to the booster hopper having the article of the weighed value closest to a statistical value based on the learning of the combination calculation, as a zero-correction target.

4. The combination weighing device according to claim 1, wherein the control unit performs zero-correction of the weighing hopper on the basis of a priority involved with the zero-correction of the weighing hopper and raises the priority of the selected weighing hopper.

5. The combination weighing device according to claim 4, wherein the control unit sets the priority on the basis of the number of times of the zero-correction of the weighing hopper and raises the priority of the weighing hopper of which the number of times of zero-correction is small.

6. The combination weighing device according to claim 1, wherein the control unit adds the weighing hopper not selected as the zero-correction target to the weighing hopper selected as the zero-correction target, as a zero-correction target on the basis of an interval from the previous zero-correction of the weighing hopper not selected as the zero-correction target to a current time point.

7. The combination weighing device according to claim 1, wherein the control unit performs zero-correction of the weighing hopper satisfying a predetermined reference when an interval from the previous zero-correction to a current time point satisfies the reference.

8. The combination weighing device according to claim 6, wherein the control unit performs zero-correction of the weighing hopper satisfying a predetermined reference when an interval from the previous zero-correction to a current time point satisfies the reference.

* * * * *